United States Patent
Masada (10) Patent No.: US 7,658,072 B2
(45) Date of Patent: Feb. 9, 2010

(54) HIGHLY EFFICIENT HEAT CYCLE DEVICE

(76) Inventor: Noboru Masada, Cosmos Tsudanuma Urbane 402, 1-4-1, Yatsumachi, Narashino-shi, Chiba 275-0027 (JP)

( * ) Notice: Subject to any disclaimer, the term of this patent is extended or adjusted under 35 U.S.C. 154(b) by 439 days.

(21) Appl. No.: 11/579,268

(22) PCT Filed: Jun. 1, 2004

(86) PCT No.: PCT/JP2004/007516

§ 371 (c)(1),
(2), (4) Date: Nov. 1, 2006

(87) PCT Pub. No.: WO2005/119016

PCT Pub. Date: Dec. 15, 2005

(65) Prior Publication Data

US 2008/0028766 A1    Feb. 7, 2008

(51) Int. Cl.
*F01K 23/02*    (2006.01)
*F01K 23/06*    (2006.01)

(52) U.S. Cl. .............. 60/670; 60/691; 60/655; 62/238.4; 62/238.6

(58) Field of Classification Search .......... 60/655, 60/670, 715, 716, 326, 238.4, 238.6, 690–693; 62/498, 513, 515, 910, 238.4, 238.6
See application file for complete search history.

(56) References Cited

U.S. PATENT DOCUMENTS

| | | | | |
|---|---|---|---|---|
| 2,969,637 A | * | 1/1961 | Rowekamp | 60/641.8 |
| 4,366,674 A | * | 1/1983 | Eakman | 60/618 |
| 4,726,226 A | | 2/1988 | Tellerman | |
| 5,431,016 A | * | 7/1995 | Simpkin | 60/650 |
| 5,860,279 A | * | 1/1999 | Bronicki et al. | 60/655 |
| 6,365,289 B1 | * | 4/2002 | Lee et al. | 429/13 |
| 6,529,849 B2 | * | 3/2003 | Umezawa et al. | 702/136 |
| 2004/0237527 A1 | * | 12/2004 | Kato et al. | 60/670 |

FOREIGN PATENT DOCUMENTS

| | | |
|---|---|---|
| JP | 110402 | 5/1935 |
| JP | 43-4068 | 2/1968 |
| JP | 51-52352 | 4/1976 |
| JP | 54-027640 | 3/1979 |
| JP | 56-31234 | 3/1981 |

(Continued)

OTHER PUBLICATIONS

Mori, Y. et al., *Nagare to Netsu no Kogaku II, Engineering Science Lectureship*, vol. 14 (Oct. 10, 1978), pp. 194-219.

*Primary Examiner*—Thomas E Denion
*Assistant Examiner*—Christopher Jetton
(74) *Attorney, Agent, or Firm*—Wenderoth, Lind & Ponack, L.L.P.

(57) ABSTRACT

A high-efficient heat cycle device formed by combining a heat engine with a refrigerating machine, wherein steam generated in a boiler is cooled by a condenser after driving turbine, built up by a pump, and circulated into the boiler in the form of high-pressure condensate. Refrigerant gas compressed by a compressor is passed through the radiating side of a heat exchanger for cooling after driving the turbine to output a work, and built up by a pump to form high-pressure refrigerant liquid. The high-pressure refrigerant liquid drives a reaction water-turbine to output a work and is expanded and vaporized to form refrigerant gas. The refrigerant gas is led into the compressor after being passed through the heat absorbing side of the heat exchanger and the condenser for heating.

11 Claims, 7 Drawing Sheets

FOREIGN PATENT DOCUMENTS

| | | |
|---|---|---|
| JP | 61-79955 | 4/1986 |
| JP | 61-229905 | 10/1986 |
| JP | 2-40007 | 2/1990 |
| JP | 402241911 A * | 9/1990 |
| JP | 2003-227409 | 8/2003 |
| JP | 2003-322425 | 11/2003 |

* cited by examiner

HIGHLY EFFICIENT HEAT CYCLE DEVICE

TECHNICAL FIELD

The present invention relates to a heat cycle system including a heat engine that extracts power through a turbine and also relates to a heat cycle system comprising a combination of such a heat engine and a refrigerator. More particularly, the present invention relates to a technique for improving the thermal efficiency of a heat cycle system by combining together a heat engine and a refrigerator and transferring (heat crossing) the waste heat of turbine outlet steam to a working fluid at the turbine inlet side.

BACKGROUND ART

There have heretofore been many inventions using waste heat to improve the efficiency of a heat cycle system including a steam turbine. For example, JP-A-54-27640(Japanese Patent Public Disclosure) discloses an electric power generation system that recovers thermal energy of a high-temperature exhaust gas. The electric power generation system has a waste heat boiler installed at the upstream side of a high-temperature exhaust gas flow path and a fluid preheater at the downstream side thereof. Steam generated in the waste heat boiler is used to drive a steam turbine. A low-boiling point special fluid is preheated by the fluid preheater and further heated to evaporate by a fluid evaporator that utilizes the exhaust of the steam turbine. The evaporated special fluid drives a special fluid turbine. The output of the steam turbine and the output of the special fluid turbine are combined together to drive an electric generator to generate electric power. After being discharged from the special fluid turbine, the low-boiling point special fluid is condensed to liquid in a heat exchanger. The condensed liquid is pressurized by a pump and preheated by the heat exchanger before being recirculated to the fluid preheater.

Assuming that while a working substance is performing one cycle, i.e. undergoing successive changes and then returning to the previous state, it receives a quantity of heat $Q_h$ from a high heat source at a temperature $T_h$ and loses a quantity of heat $Q_b$ from a low heat source at a temperature $T_b$ to do work L (assumed to be a value expressed in terms of heat quantity) to the outside, the following relationship holds:

$$Q_h = Q_b + L \tag{Eq. 1}$$

In heat engines, the work L is given to the outside. In refrigerators or heat pumps, the work L is given to a working fluid from the outside. In the case of heat engines, it is desirable that the quantity of heat $Q_h$ received from the high heat source should be minimum, and the work L given to the outside should be maximum. Accordingly, the following equation is referred to as thermal efficiency:

$$\eta = L/Q_h \tag{Eq. 2}$$

From the above equation, L may be rewritten as follows:

$$\eta = (Q_h - Q_b)/Q_h \tag{Eq. 3}$$

The thermal efficiency $\eta$ of a heat engine that performs a reversible Carnot cycle may be expressed by using thermodynamic temperatures $T_h°$ K and $T_b°$ K as follows:

$$\eta = (T_h - T_b)/T_h = 1 - (T_b/T_h) \tag{Eq. 4}$$

In general, an apparatus that transfers heat from a low-temperature object to a high-temperature object is called a "refrigerator". The refrigerator is an apparatus that is generally used for the purpose of cooling objects. Meanwhile, an apparatus that transfers heat from a low-temperature object to a high-temperature object to heat the latter is referred to as a "heat pump". The name "heat pump" may be regarded as an alias for the refrigerator when the usage is changed. The heat pump is used, for example, for a heating operation of an air conditioner for heating and cooling. The relationship between the quantity of heat $Q_b$ absorbed from a low-temperature object, the quantity of heat $Q_h$ given to a high-temperature object, and the work L (value expressed in terms of heat quantity) done from the outside to operate the heat pump is expressed as follows:

$$Q_h = Q_b + L \tag{Eq. 5}$$

It can be said that, for the same work done, the larger the quantity of heat $Q_h$ given, the higher the cost efficiency of the heat pump. Accordingly, the following equation is referred to as the coefficient of performance of the heat pump:

$$\epsilon = Q_h/L \tag{Eq. 6}$$

From the above Eq. 5, L is:

$$L = Q_h - Q_b \tag{Eq. 7}$$

Hence, the performance coefficient $\epsilon$ is expressed as follows:

$$\epsilon = Q_h/(Q_h - Q_b) \tag{Eq. 8}$$

Assuming that the absolute temperature of the low heat source is $T_b°$ 0 K and the absolute temperature of the high heat source is $T_h°$ K, a heat pump that performs a reversible Carnot cycle exhibits the largest coefficient of performance among heat pumps operating between the two heat sources. The performance coefficient $\epsilon$ of the heat pump is:

$$\epsilon = T_b/(T_h - T_b) \tag{Eq. 9}$$

The reversible Carnot cycle consists of two isothermal changes and two adiabatic changes and exhibits the maximum thermal efficiency among all cycles operating between the same high and low heat sources.

Figure 1:
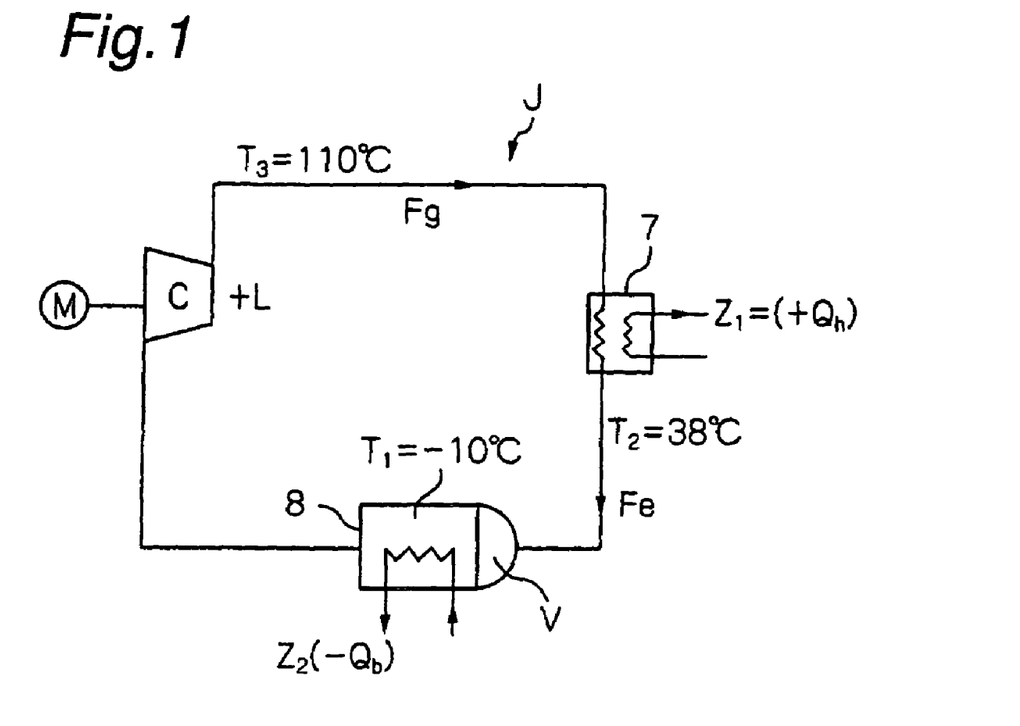
FIG. 1 is an arrangement plan showing constituent elements of a conventional refrigerator.

FIG. 1 is an arrangement plan showing constituent elements of a conventional refrigerator J. Refrigerant gas Fg raised in pressure by a compressor C gives heat $Q_h$ to a fluid $Z_1$ in a heat exchanger (condenser) 7, thereby being condensed. Thereafter, the refrigerant is expanded through an expansion valve V. Consequently, the refrigerant lowers in temperature and, at the same time, absorbs heat $Q_b$ from a fluid $Z_2$ in a heat exchanger 8 to cool the fluid $Z_2$. Thereafter, the refrigerant is returned to the compressor C and then recirculated. Let us discuss the thermal calculation of a refrigerator arranged as shown in FIG. 1 and adapted to use ammonia as a refrigerant. For the sake of simplicity, let us assume that there is no mechanical loss. The temperature of the refrigerant is 110° C. ($T_3$) at the outlet of the compressor C, 38° C. ($T_2$) at the outlet of the condenser 7, and −10° C. ($T_1$) at the outlet of the evaporator V. Therefore, the performance coefficient (theoretically maximum performance coefficient) $\epsilon$ of the refrigerator on the reversible Carnot cycle is:

$$\varepsilon = T_1/(T_2 - T_1) = [273.15 + (-10)]/[38 - (-10)] \approx 5.4 \tag{Eq. 10}$$

In the refrigerator shown in FIG. 1, if the input L (work) of the compressor C is assumed to be 1, because the performance coefficient of the refrigerator is +1, the performance coefficient $\epsilon_h$ of the heat pump is:

$$\epsilon_h = 5.4 + 1 = 6.4 \tag{Eq. 11}$$

Figure 2:
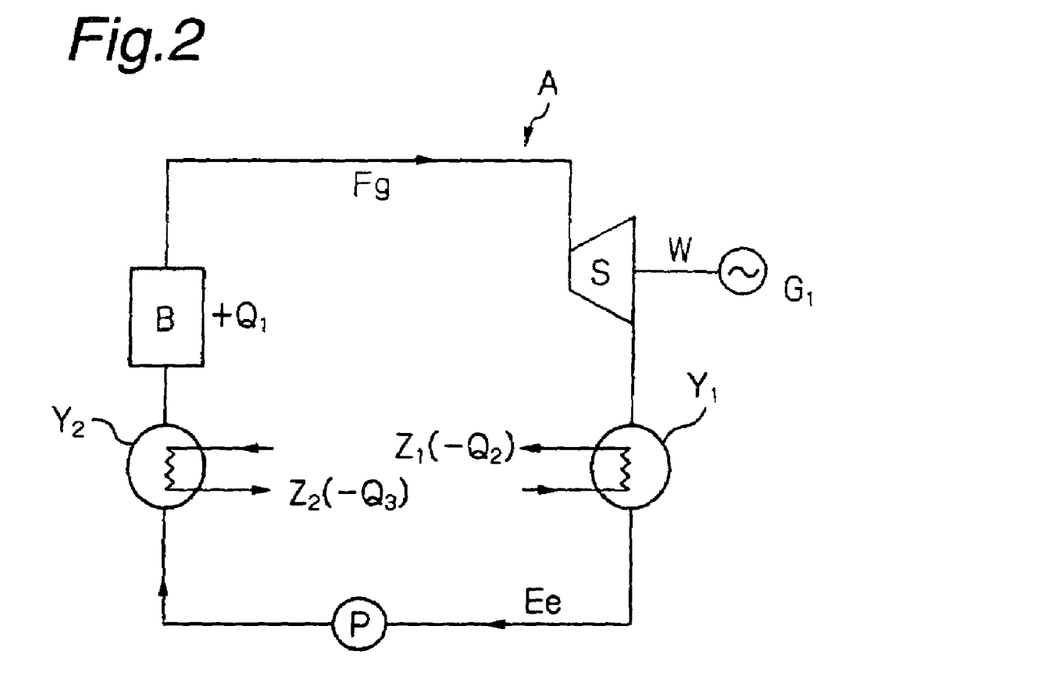
FIG. 2 is an arrangement plan showing basic constituent elements of a conventional heat engine including a turbine, i.e. a heat cycle system that performs a Rankine cycle.

FIG. 2 is an arrangement plan showing basic constituent elements of a heat engine A including a steam turbine, i.e. a heat cycle system including a Rankine cycle. High-temperature and high-pressure steam Fg generated in a boiler B is supplied to a turbine S to rotate it, thereby generating power (work) W. The steam is cooled to form condensate Ee in a condenser $Y_1$ communicating with the exhaust opening of the turbine. The condensate Ee is raised in pressure by a pump P and then supplied to the boiler B. In the heat cycle system shown in FIG. 2, when waste heat $Q_2$ from the condenser $Y_1$ is not utilized at all, work W (value expressed in terms of heat quantity) generated from the turbine S has no loss and is given by:

$$W = Q_1 - Q_2 \quad \text{(Eq. 12)}$$

The thermal efficiency $\eta_s$ of the turbine S is:

$$\eta_s = (Q_1 - Q_2)/Q_1 \quad \text{(Eq. 13)}$$

In Eq. 13, $Q_1$ is the quantity of heat retained by the working fluid at the turbine inlet side, and $Q_2$ is the quantity of heat output from the working fluid at the turbine outlet side, which is equal to the quantity of waste heat discharged from the condenser $Y_1$.

The thermal efficiency $\eta_0$ of the heat cycle system shown in FIG. 2, i.e. the ratio $\eta_0$ of work W generated from the turbine S to the quantity of heat (retained heat quantity) $Q_1$ input to the working fluid in the heat cycle system, is given by:

$$\eta_0 = W/Q_1 \quad \text{(Eq. 14)}$$

If W in Eq. 14 is replaced by $W = Q_1 - Q_2$ of Eq. 12, we have:

$$\eta_0 = (Q_1 - Q_2)/Q_1 \quad \text{(Eq. 16)}$$

This is the same as the above-mentioned $\eta_s$. Therefore, the following relationship holds:

$$\eta_0 = \eta_s \quad \text{(Eq. 17)}$$

In the heat cycle system of FIG. 2, if a part or whole $Q_3$ of the waste heat $Q_2$ from the condenser $Y_1$ is transferred to the condensate at the boiler inlet by a feedwater preheater $Y_2$, i.e.

$$0 \leq Q_3 \leq Q_2 \quad \text{(Eq. 18)}$$

and, at the same time, the quantity of heat input to the boiler is reduced by the same amount as the quantity of heat transferred from the condenser $Y_1$, then the boiler input heat quantity is $Q_1 - Q_3$. The quantity of heat retained by steam Fg at the inlet of the turbine S is given by:

Boiler input heat quantity $(Q_1-Q_3)$+(heat quantity $Q_3$ transferred by $Y_2$)=$Q_1$ (Eq. 19)

The quantity of heat retained by steam Fg at the outlet of the turbine S can be regarded as being $Q_2$. Therefore, power W (value expressed in terms of heat quantity) generated from the turbine S is:

$$W = Q_1 - Q_2 \quad \text{(Eq. 20)}$$

Hence, the thermal efficiency $\eta_s$ of the turbine S is:

$$\eta_s = (Q_1 - Q_2)/Q_1 \quad \text{(Eq. 21)}$$

Thus, the thermal efficiency $\eta_s$ of the turbine S is the same as in the case where the waste heat $Q_2$ from the condenser $Y_1$ is not utilized.

SUMMARY OF THE INVENTION

An object of the present invention is to provide a heat cycle system wherein the waste heat of steam turbine outlet steam is transferred (heat crossing) to a working fluid at the steam turbine inlet side, thereby allowing the thermal efficiency of the heat cycle system to increase even when the thermal efficiency of the turbine itself is small. It is also an object of the present invention to increase the thermal efficiency of a heat cycle system including a steam turbine and also a heat cycle system comprising a combination of a steam turbine and a refrigerator. More specifically, an object of the present invention is to increase the thermal efficiency of a heat cycle system by transferring (heat crossing) the waste heat of steam turbine outlet steam to a working fluid at the steam turbine inlet side. Another object of the present invention is to increase the thermal efficiency of a heat cycle system by transferring waste heat or heat in nature to a working fluid by using a heat pump. Still another object of the present invention is to minimize the quantity of externally dissipated heat from a condenser of a refrigerator and to extract a controlled heat quantity as power without effecting heat crossing.

A further object of the present invention is to convert low-temperature waste heat having low utility, e.g. low-temperature waste heat in a Rankine cycle, into a high-temperature thermal output by using a refrigerator. A still further object of the present invention is to provide a heat cycle system wherein the refrigeration output of a refrigerator is used as a low heat source of a condenser (cooler) installed at the turbine outlet in a Rankine cycle, and the refrigerator is operated as a heat pump, thereby allowing heat emitted from the condenser to be raised in temperature and supplied as a thermal output to the outside. A part of the thermal output supplied to the outside is usable as a heat source for heating in the Rankine cycle. In the present invention, the heat crossing ratio $Q_3/Q_1$ is increased by using a refrigerating cycle, so that $\eta = 1$ ... (Eq. 27) is realized in $\eta = \eta_s/(1 - Q_3/Q_1)$ ... (Eq. 32), or $\eta$ is made as close to 1 as possible. In the present invention, the refrigerating cycle has a turbine installed upstream of a condenser in a conventional refrigerating cycle in which a refrigerant is compressed by a compressor. The condenser is equivalent to a condenser in a stream turbine cycle. Other objects of the present invention will be made apparent in the following description of the invention.

In the heat cycle system of FIG. 2, if a part or whole $Q_3$ of the waste heat $Q_2$ from the condenser $Y_1$ is transferred to the condensate at the boiler inlet by the feedwater preheater $Y_2$ and, at the same time, the boiler input heat quantity is reduced by the same amount as the heat quantity $Q_3$ transferred from the condenser $Y_1$, i.e. $(Q_1 - Q_3)$, the thermal efficiency $\eta$ of the heat cycle system shown in FIG. 2, that is, the ratio of the work W generated from the turbine S, i.e. $W = Q_1 - Q_2$ ... (Eq. 22), to the input heat quantity of the heat cycle system, i.e. $(Q_1 - Q_3)$, is expressed as follows:

$$\eta = W/(Q_1 - Q_3) = (Q_1 - Q_2)/(Q_1 - Q_3) \quad \text{(Eq. 23)}$$

In the heat cycle system of FIG. 2, if the waste heat $Q_2$ from the condenser $Y_1$ is not utilized at all, i.e. $Q_3 = 0$, the above Eq. 23 becomes as follows:

$$\eta = (Q_1 - Q_2)/Q_1 \quad \text{(Eq. 24)}$$

In the case of $0 \leq Q_3 \leq Q_2$ ... (Eq. 18), we have:

$$\eta = (Q_1 - Q_2)/(Q_1 - Q_3) \quad \text{(Eq. 25)}$$

In the case of Eq. 25, the denominator is smaller than that in Eq. 24 by $-Q_3$, and hence the value of $\eta$ becomes correspondingly larger than in Eq. 24.

If the whole $Q_2$ of waste heat from the condenser is transferred to the condensate at the upstream or downstream side of the pump P, we have:

$$Q_2 = Q_3 \quad \text{(Eq. 26)}$$

Hence, the thermal efficiency η of the heat cycle system is:

$$\eta = 1 \quad \text{(Eq. 27)}$$

In the heat cycle system of FIG. 2, the thermal efficiency η thereof in the case of $0 \leq Q_3 \leq Q_2 \ldots$ (Eq. 18) is, as stated above, given by:

$$\eta = (Q_1 - Q_2)/(Q_1 - Q_3) \quad \text{(Eq. 28)}$$

If the denominator and numerator of Eq. 28 are each divided by $Q_1$, we have:

$$\eta = [(Q_1 - Q_2)/Q_1]/[(Q_1 - Q_3)/Q_1] \quad \text{(Eq. 29)}$$

Eq. 29 may be modified as follows:

$$\eta = [(Q_1 - Q_2)/Q_1]/[1 - (Q_3/Q_1)] \quad \text{(Eq. 30)}$$

If $\eta_s = (Q_1 - Q_2)/Q_1 \ldots$ (Eq. 21) is inserted into Eq. 30, we have:

$$\eta = \eta_s/(1 - Q_3/Q_1) \quad \text{(Eq. 32)}$$

In the present invention, even heat having low utility value, such as waste heat, is taken into the heat cycle system by using a heat pump, and a power output is taken out by a turbine in the heat cycle system. The heat cycle system according to the present invention uses heat crossing to extract power from the turbine at high efficiency. When the whole of waste heat $Q_2$ from the condenser $Y_1$ is utilized, the thermal efficiency η of the heat cycle system is η=1 according to Eq. 27.

As will be understood from the above Eq. 32, the thermal efficiency η of the heat cycle system is determined by the thermal efficiency $\eta_s$ of the turbine S and the heat quantity $Q_3$ transferred from the waste heat of the condenser $Y_1$ to the condensate at the upstream or downstream side of the pump P. As $Q_3$ increases to approach $Q_1$, the denominator of Eq. 30, i.e. $(1 - Q_3/Q_1)$, decreases. Consequently, η increases. It is difficult to increase the heat crossing ratio $Q_3/Q_1$ in heat cycles other than the refrigerating cycle. The reason for this is that it is impossible to increase the temperature difference between a high heat source and a low heat source for heat transfer (heat crossing). Further, Eq. 27 cannot be realized in heat cycles other than the refrigerating cycle.

Figure 3:
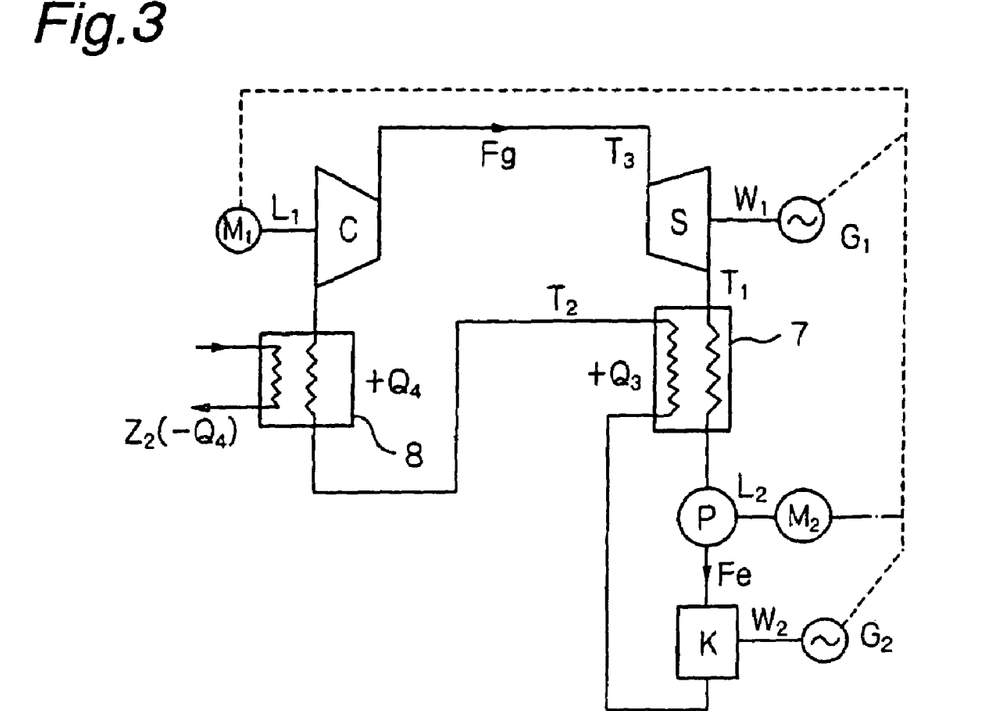
FIG. 3 is an arrangement plan of a heat cycle system according to a first embodiment of the present invention.

A heat cycle system according to a first feature of the present invention includes a compressor, a turbine, heat exchangers, and a pump. In the heat cycle system, a working gas (refrigerant gas) compressed in the compressor (C) drives the turbine (S) to deliver work ($W_1$). Thereafter, the working gas is cooled by passing through the heat dissipating side of the first heat exchanger (7) and then raised in pressure by the pump (P) to form high-pressure working liquid. The high-pressure working liquid drives a reaction water turbine (K) to deliver work ($W_2$). At the same time, the working liquid is expanded, and a part of it evaporates. The remaining liquid passes through the heat absorbing side of the first heat exchanger (7) and through the second heat exchanger (8), thereby being heated to evaporate. Thereafter, the working gas is introduced into the compressor (C) in a somewhat overheated state (FIG. 3).

Figure 5:
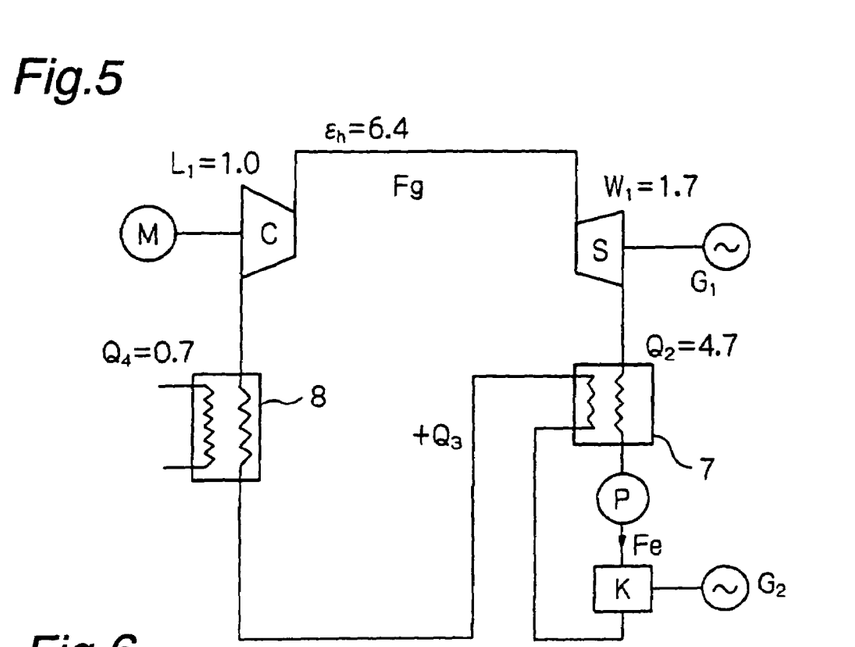
FIG. 5 is an explanatory view showing an example of heat quantity in the heat cycle system according to the first embodiment of the present invention.
Figure 6:
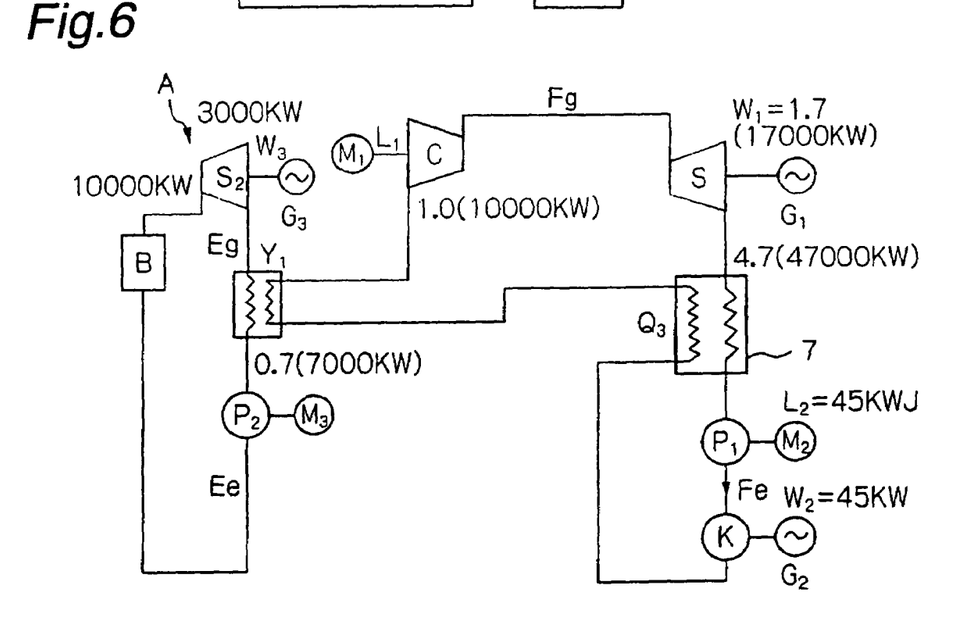
FIG. 6 is an arrangement plan of a heat cycle system according to a second embodiment of the present invention.
Figure 14:
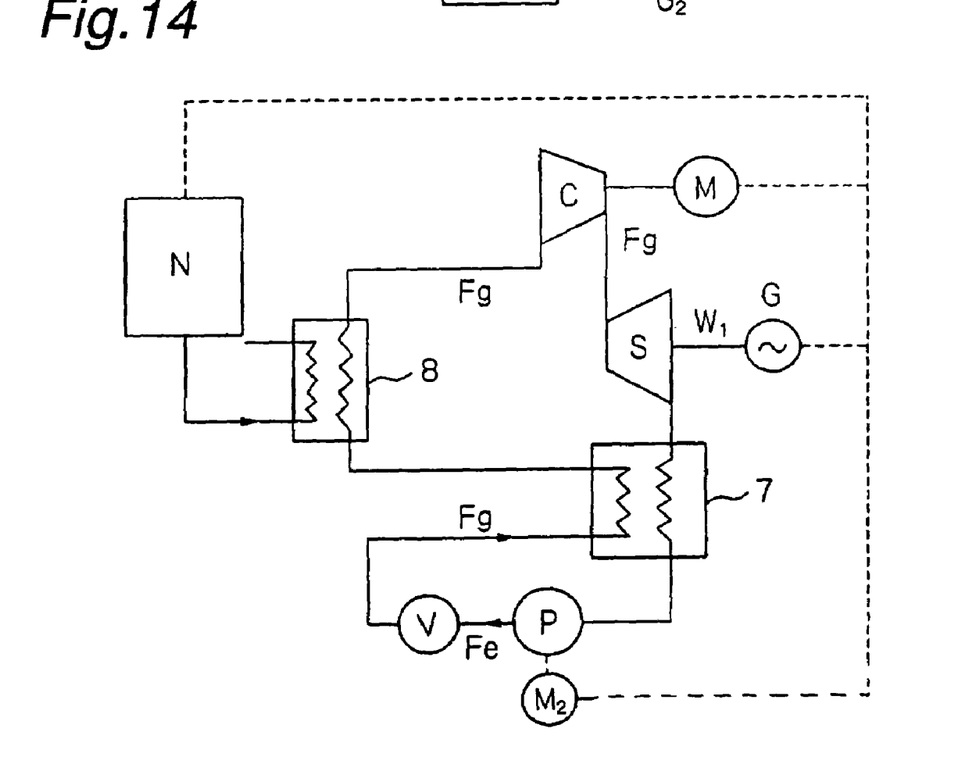
FIG. 14 is an arrangement plan of a heat cycle system according to a ninth embodiment of the present invention.

Preferably, the work ($W_2$) delivered from the reaction water turbine (K) and power ($L_2$) consumed by the pump (P) approximately cancel each other. In addition, a compressor driving motor ($M_1$), a turbogenerator ($G_1$), a pump driving motor ($M_2$), and a water turbine-driven generator ($G_2$) are electrically connected to each other (FIGS. 3 and 5). The second heat exchanger (8) may be a condenser that transfers the waste heat of turbine exhaust steam in a Rankine cycle to the working gas (FIG. 6). The second heat exchanger (8) may be a heat exchanger that transfers waste heat from a fuel cell to the working gas (FIG. 14).

Figure 4:
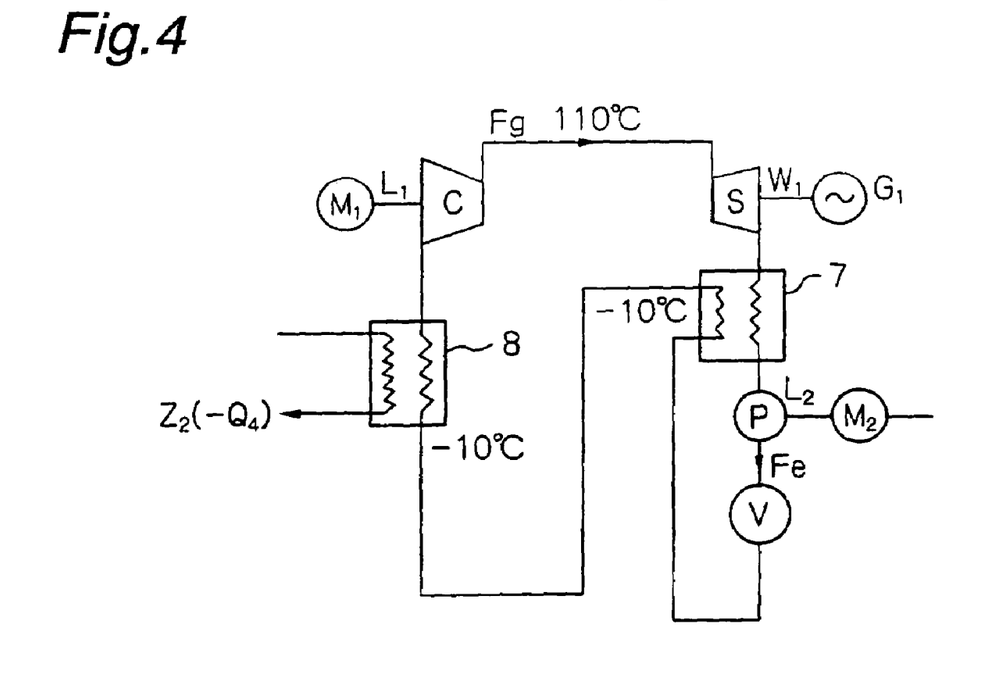
FIG. 4 is an explanatory view showing an example of temperature and pressure in a heat cycle system according to a modification of the first embodiment of the present invention.

In the heat cycle system according to the first feature of the present invention, the reaction water turbine (K) may be simply an expansion valve (V) (FIG. 4). In this case, the high-pressure working liquid raised in pressure by the pump (P) is expanded through the expansion valve (V). Consequently, a part of the working liquid evaporates to form working gas. The remaining liquid passes through the first heat exchanger (7) and through the second heat exchanger (8), thereby being heated to evaporate. Thereafter, the working gas is introduced into the compressor (C) in a somewhat overheated state (FIG. 4). The heat cycles of the systems shown in FIGS. 3 and 4 are basic cycles in the present invention. The heat cycle shown in FIG. 4 is a simplified version of the heat cycle shown in FIG. 3.

In the heat cycle system according to the first feature of the present invention, the thermal efficiency η of the heat cycle system is:

$$\eta = (Q_1 - Q_2)/(Q_1 - Q_3) \quad \text{(Eq. 28)}$$

$$= \eta_s/(1 - Q_3/Q_1) \quad \text{(Eq. 32)}$$

$$Q_3 = (1 \text{ to } 0.1)Q_2$$

where:

$\eta_s$ is the thermal efficiency of the turbine;

$Q_1$ is the quantity of input heat transmitted to the working fluid at the turbine inlet side;

$Q_2$ is the quantity of heat output from the working fluid at the turbine outlet side; and $Q_3$ is the quantity of heat transferred (heat crossing) from the working fluid at the turbine outlet side to the working fluid at the turbine inlet side.

As $Q_3$ increases, the denominator of Eq. 28 or 32 decreases, and the thermal efficiency η of the heat cycle system increases.

Figure 7:
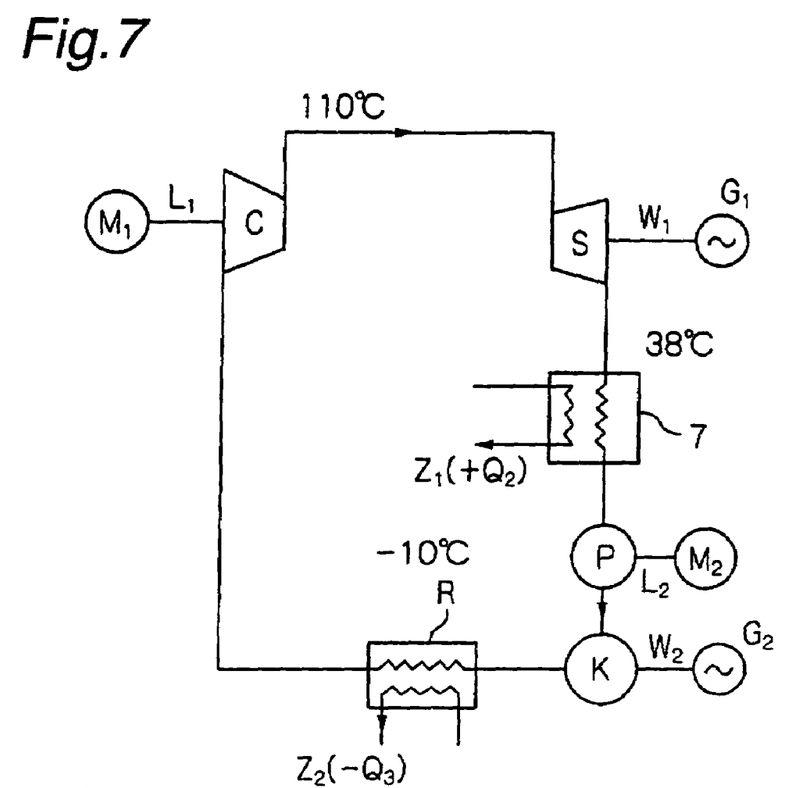
FIG. 7 is an arrangement plan of a heat cycle system according to a third embodiment of the present invention.

A heat cycle system according to a second feature of the present invention includes a compressor, a turbine, heat exchangers, and a pump. In the heat cycle system, a working gas (refrigerant gas) compressed in the compressor (C) drives the turbine (S) to deliver work ($W_1$). Thereafter, the working gas is cooled by passing through the heat dissipating side of the first heat exchanger (7) and then raised in pressure by the pump (P) to form high-pressure working liquid (refrigerant liquid). The high-pressure working liquid drives a reaction water turbine (K) to deliver work ($W_2$). At the same time, the working liquid is expanded and evaporated through an evaporator (R) to form working gas. The working gas is introduced into the compressor (C) (FIG. 7).

Figure 8:
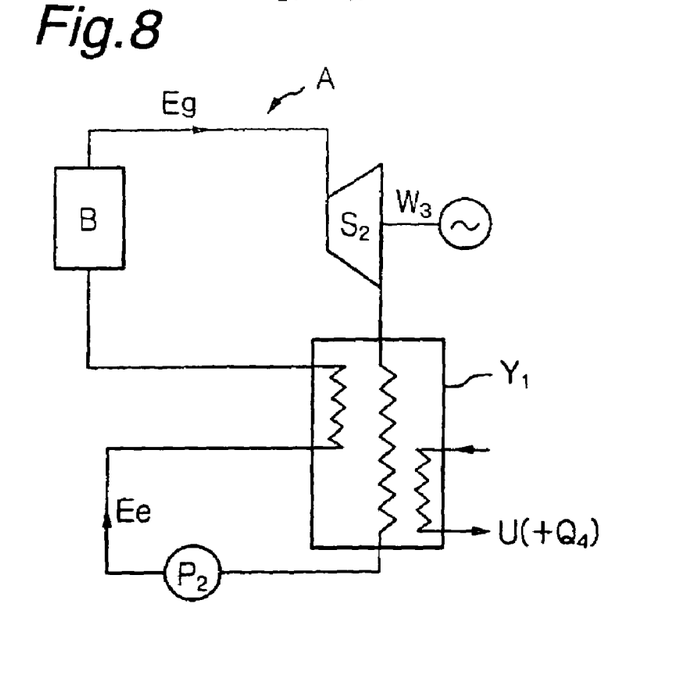
FIG. 8 is an arrangement plan of a heat cycle system according to a fourth embodiment of the present invention.

A heat cycle system according to a third feature of the present invention includes a boiler, a turbine, a heat exchanger, and a pump. In the heat cycle system, steam generated in the boiler (B) drives the turbine ($S_2$) to deliver work ($W_3$). Thereafter, the steam is cooled by passing through the heat dissipating side of the condenser ($Y_1$) and then raised in pressure by the pump ($P_2$) to form high-pressure working liquid. The high-pressure working liquid is heated by passing through the heat receiving side of the condenser ($Y_1$) before being returned to the boiler (B). Preferably, the steam that is cooled by passing through the heat dissipating side of the condenser ($Y_1$) is further cooled by an external cooling fluid (U) before being sucked into the pump ($P_2$). By doing so, a thermal output ($Q_4$) can be supplied to the outside (FIG. 8). In this heat cycle system also, the following equation holds:

$$\eta = \eta_s/(1 - Q_3/Q_1) \quad \text{(Eq. 32)}$$

Figure 9:
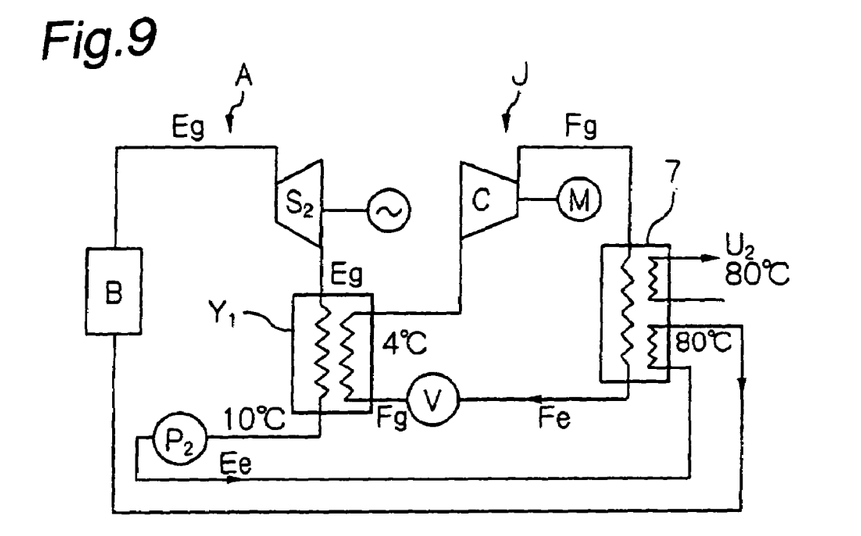
FIG. 9 is an arrangement plan of a heat cycle system according to a fifth embodiment of the present invention.

A heat cycle system according to a fourth feature of the present invention comprises a combination of a heat engine including a boiler, a turbine, a condenser, and a pump, and a refrigerator including a compressor, a heat exchanger, and an expansion valve. In the heat cycle system, steam (Eg) generated in the boiler (B) drives the turbine ($S_2$). Thereafter, the steam is cooled in the condenser ($Y_1$) and raised in pressure by the pump ($P_2$) to form high-pressure condensate, which is then recirculated to the boiler (B). Refrigerant gas (Fg) compressed in the compressor (C) is cooled and liquefied at the heat dissipating side of the heat exchanger (7) to form refrigerant liquid (Fe). The refrigerant liquid (Fe) is expanded through the expansion valve (V) to form refrigerant gas (Fg) and then introduced into the condenser ($Y_1$), where the refrigerant gas (Fg) cools the steam (Eg) exhausted from the turbine. At the same time, the refrigerant gas (Fg) itself is heated and then returned to the compressor (C). Preferably, the high-pressure condensate is heated by passing through the heat receiving side of the heat exchanger (7) before being recirculated to the boiler (B). The heat receiving side of the heat exchanger (7) supplies a thermal output ($U_2$) to the outside (FIG. 9).

Figure 10:
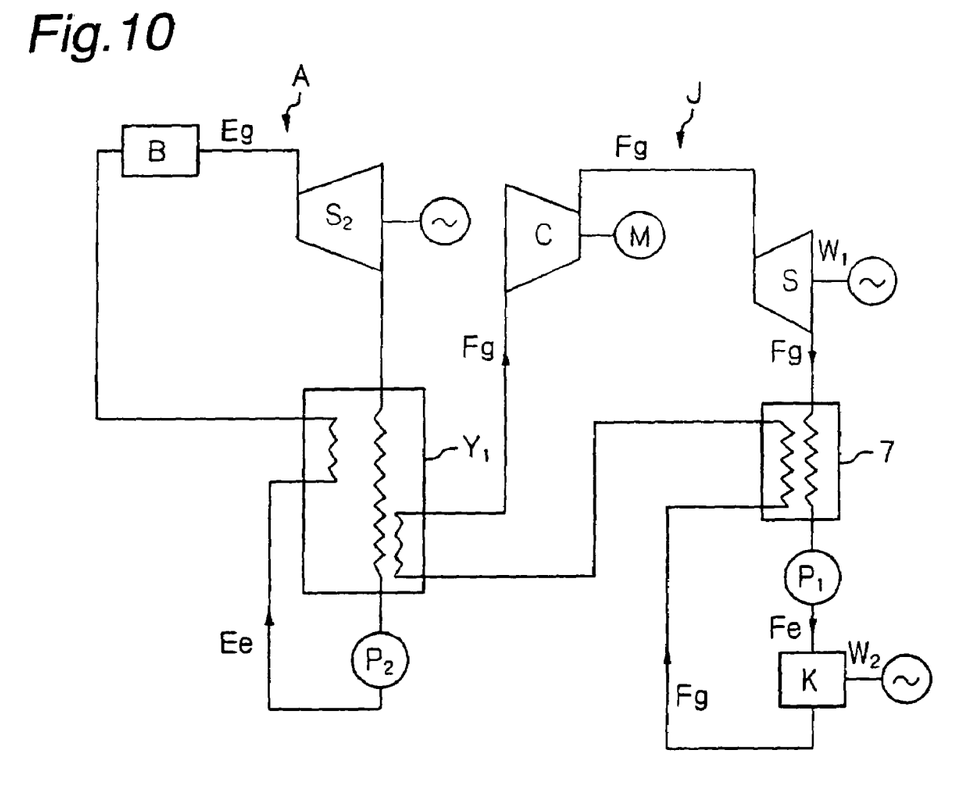
FIG. 10 is an arrangement plan of a heat cycle system according to a sixth embodiment of the present invention.

According to a fifth feature of the present invention, the refrigerator in the heat cycle system comprising a combination of the heat engine and the refrigerator includes a turbine (S), a pump ($P_1$), and a reaction water turbine (K). Refrigerant gas compressed in the compressor (C) drives the turbine (S) to deliver work ($W_1$). Thereafter, the refrigerant gas is cooled by passing through the heat dissipating side of the heat exchanger (7) and then raised in pressured by the pump ($P_1$) to form high-pressure refrigerant liquid. The high-pressure refrigerant liquid drives the reaction water turbine (K) to deliver work ($W_2$). At the same time, the refrigerant liquid is expanded and evaporated to form refrigerant gas. The refrigerant gas is heated by passing through the heat absorbing side of the heat exchanger (7) and through the condenser ($Y_1$). Thereafter, the refrigerant gas is introduced into the compressor (C). The high-pressure condensate is heated in the condenser ($Y_1$) before being recirculated to the boiler (B) (FIG. 10).

Figure 12:
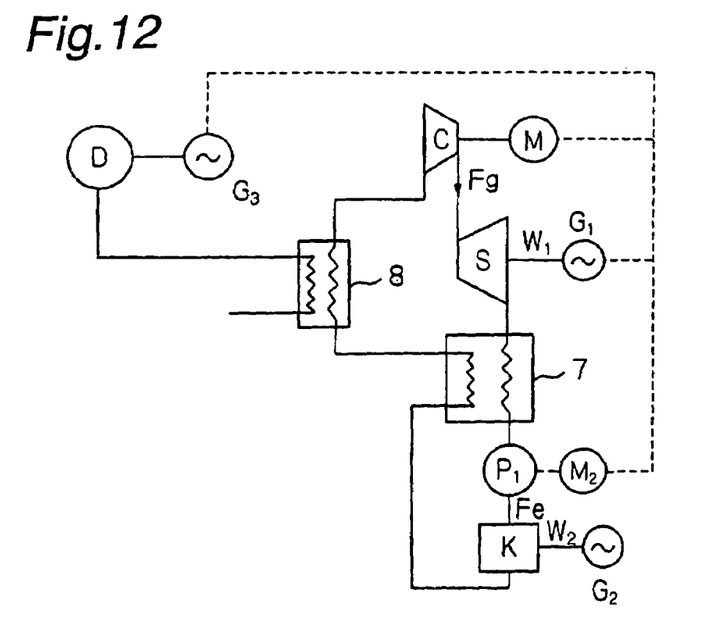
FIG. 12 is an arrangement plan of a heat cycle system according to a seventh embodiment of the present invention.
Figure 13:
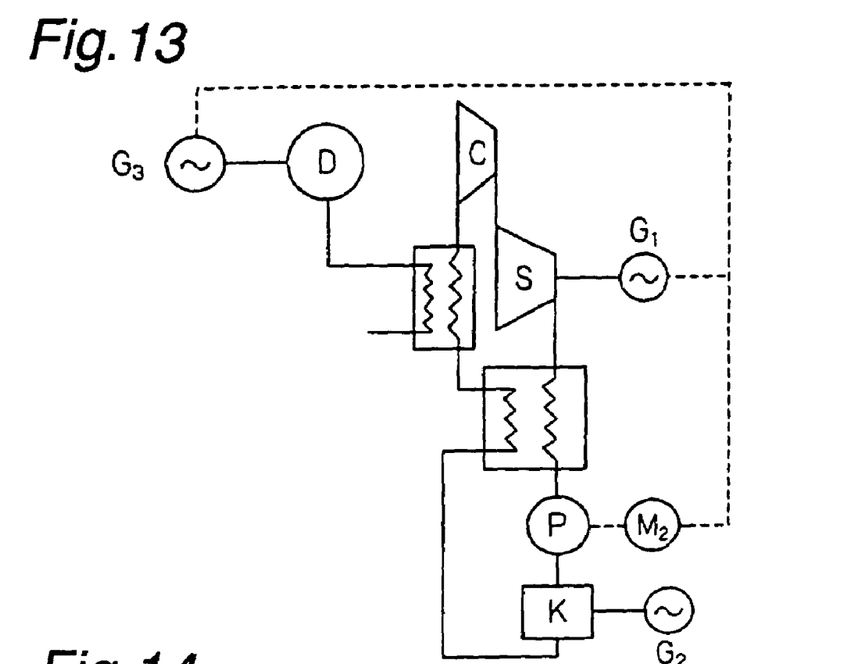
FIG. 13 is an arrangement plan of a heat cycle system according to an eighth embodiment of the present invention.

A heat cycle system according to a sixth feature of the present invention comprises a combination of a heat engine and a refrigerator including a compressor, a turbine, heat exchangers, a pump, and an expansion valve. In the heat cycle system, refrigerant gas (Fg) compressed in the compressor (C) drives the turbine (S) to deliver work ($W_1$). Thereafter, the refrigerant gas is cooled at the heat dissipating side of the heat exchanger (7) and then raised in pressure by the pump ($P_1$) to form high-pressure refrigerant liquid (Fe). The high-pressure refrigerant liquid drives the reaction water turbine (K) to deliver work ($W_2$). At the same time, the refrigerant liquid is expanded and evaporated to form refrigerant gas (Fg). The refrigerant gas is introduced into the heat exchanger (8), where it is heated by waste heat from the heat engine (D), and then returned to the compressor (C). Preferably, the compressor (C) is driven by either the output ($W_3$) from the heat engine (D) or a fuel cell (FIGS. 12 and 13).

The heat cycle system (FIGS. 6 and 9) according to the present invention that comprises a combination of a Rankine cycle and a refrigerator having a turbine does not require water for cooling that is indispensable when the Rankine cycle is operated singly, not in combination with a refrigerator. Capability of installing the Rankine cycle without the need of cooling water allows conditions of location for thermal electric power plants to be eased extremely and increases the possibility of siting thermal electric power plants in places that produce fuel or biomass fuel. In the case of electric power plants that use coal as fuel, in particular, the possibility of improving economic effect can be increased by generating electricity near a coal producing region and transmitting it to a place where electric power is consumed.

The present invention is capable of recovering power from the heat of condensation in a refrigerator and of minimizing the release of heat to the outside of the system, as shown in the heat cycle system of FIG. 3. Therefore, the present invention has the advantageous effect of easing the "heat island" phenomenon, which has been deteriorating the environment of large cities in recent years.

EXPLANATION OF REFERENCE SYMBOLS

A, D: heat engine; B: boiler; C: compressor; $\epsilon$: performance coefficient; $\eta$: thermal efficiency of heat cycle system; $\eta_s$: thermal efficiency of turbine as used singly; Eg: steam; Ee: water (feedwater or condensate); Fg: refrigerant gas; Fe: refrigerant liquid; $G_1$, $G_2$: electric generator; J: refrigerator; K: water turbine; $L_1$, $L_2$: work (input); N: fuel cell; $M_1$, $M_2$: motor; P: pump; $Q_1$, $Q_2$, $Q_3$, $Q_4$: heat quantity; S, $S_2$: turbine; V: expansion valve; $W_1$, $W_2$, $W_3$: work (output); 7, 8: heat exchanger; $Y_1$: condenser; $Y_2$: feedwater preheater.

DETAILED DESCRIPTION OF THE INVENTION

FIG. 3 is an arrangement plan of a heat cycle system according to a first embodiment of the present invention. The heat cycle system has an arrangement in which a turbine S and so forth are inserted into a refrigerator including a compressor C and a condenser. A working fluid (refrigerant gas) compressed in the compressor C drives the turbine S to deliver work $W_1$. Thereafter, the working fluid is cooled and liquefied in a heat exchanger 7 (at the heat dissipating side thereof). A pump P connected to the outlet of the heat exchanger 7 sucks in the working liquid and lowers the back pressure of the turbine S, thereby increasing the turbine output $W_1$ and raising the pressure of the working liquid. The working liquid raised in pressure drives a reaction water turbine K to deliver work $W_2$. At the same time, the working liquid is expanded through a nozzle of the reaction water turbine K that operates as an expansion valve. Thus, the working liquid evaporates to form working gas (refrigerant gas). The working gas is heated in the heat exchanger 7 (at the heat absorbing side thereof) and further heated in a heat exchanger 8 before being introduced into the compressor C.

In the heat cycle system of FIG. 3, the heat exchanger 7 releases heat from the exhaust of the turbine S to heat the working gas at the outlet of the reaction water turbine K. In the heat exchanger 7, the exhaust from the turbine S is cooled and condensed to liquid. The heat exchanger 7 in FIG. 3 increases the temperature difference between the working fluid at the inlet of the turbine S and the working fluid at the outlet thereof by cooling the exhaust from the turbine S, thereby increasing the turbine output. Waste heat $Q_1$ from the turbine exhaust is transferred (heat crossing) to the working fluid at the downstream side of the reaction water turbine K. The pressure of the working fluid is raised by the pump P because the working fluid pressure is excessively lowered by increasing the cooling capacity of the heat exchanger 7. The working liquid raised in pressure is supplied to the reaction water turbine K where the potential energy of the working fluid is recovered. It is herein assumed that the potential energy is small relative to the whole, and the work consumed by the pump P and the output of the reaction water turbine K cancel each other.

In the heat cycle system of FIG. 3, $Q_3$ is the quantity of transferred heat in the heat exchanger 7, and $Q_4$ is the quantity of heat absorbed from the outside in the heat exchanger 8. The output of the heat cycle system (the output of the turbine S) is given by:

$$(L_1+Q_4) \tag{Eq. 33}$$

The heat quantity $Q_3$ is the quantity of heat transferred from the working fluid at the outlet side of the turbine S to the working fluid at the inlet side of the compressor C to effect heat crossing.

FIG. 4 is an explanatory view showing a heat cycle system according to a modification of the first embodiment of the present invention in which an expansion valve V is used in place of the reaction water turbine K. FIG. 4 also shows an example of temperature and pressure in the heat cycle system. The exhaust from a turbine S is cooled to 0° C. ($T_4$) by refrigerant vapor at −10° C. ($T_2$) in a condenser (heat exchanger) 7. Thereafter, the pressure of the refrigerant is raised from 4.39 kgf/cm²abs to 15.04 kgf/cm²abs by a pump p and thus liquefied. $T_4$ is the temperature of the refrigerant at the outlet of the condenser 7 in FIG. 4. The refrigerant raised in pressure by the pump P is expanded and evaporated through the expansion valve V, and receives heat of $Q_1$ in the heat exchanger 7 to reach a temperature of −10° C. ($T_2$). The turbine inlet temperature is 110° C. ($T_3$), and the condenser refrigerant temperature is 0° C. ($T_4$). Therefore, the turbine efficiency $\eta_s$ on the Carnot cycle is:

$$\eta_s = (T_3 - T_4)/T_3 = (110-0)/(273.15+110) \approx 0.28 \tag{Eq. 34}$$

FIG. 5 is an explanatory view showing an example of heat quantity in the heat cycle system according to the first embodiment of the present invention. FIG. 5 illustrates the turbine output $W_1$ when the input $L_1$ of the compressor C is thrown into the system in the amount of one unit ($L_1$=1), together with the heat crossing quantity $Q_3$ at the outlet of the heat exchanger 7, and the heat quantity $Q_4$ taken into the heat exchanger 8 from the outside. The performance coefficient $\epsilon_h$ of the heat pump is the refrigerator performance coefficient plus 1, i.e.

$$\epsilon_h=5.4+1=6.4 \tag{Eq. 35}$$

The output $W_1$ of the turbine S is given by:

$$W_1=\epsilon_h \times \eta_s=6.4\times 0.28\approx 1.7 \tag{Eq. 36}$$

The heat crossing quantity $Q_3$ at the outlet of the heat exchanger 7 is:

$$Q_3=6.4-1.7=4.7 \tag{Eq. 37}$$

The heat quantity $Q_4$ absorbed from the outside in the heat exchanger 8 is:

$$Q_4=\text{refrigerator performance coefficient}-Q_3 \tag{Eq. 38}$$

Therefore, the heat quantity $Q_4$ is:

$$Q_4=5.4-4.7=0.7 \tag{Eq. 39}$$

FIG. 6 is an arrangement plan of a heat cycle system according to a second embodiment of the present invention. The heat cycle system shown in FIG. 6 is similar in arrangement to the heat cycle system according to the first embodiment (FIG. 3) of the present invention except that the heat cycle system according to the second embodiment uses waste heat in a Rankine cycle A, i.e. waste heat from a condenser $Y_1$ of a steam turbine $S_2$, as a heat source for the system. In the heat cycle system shown in FIG. 6, the quantity of heat given to steam from a boiler B is 10,000 kW, and the output $W_3$ of the turbine $S_2$ is 3,000 kW (thermal efficiency: 0.3). Waste heat (condenser waste heat) from the turbine $S_2$ is 7,000 kW. The quantity of heat transferred from the steam Eg to the refrigerant Fg in the condenser $Y_1$ is 7,000 kW.

The quantity of heat coming into and out of each element of the system shown in FIG. 6 is obtained by a proportional calculation in which the quantity of heat absorbed from the outside in the condenser $Y_1$ in the heat cycle system of FIG. 5, i.e. 0.7, is assumed to be 7,000 kW, that is, one unit in FIG. 5 is assumed to be 10,000 kW. The input L of the compressor C is L=10,000 kW, and the work $W_1$ of the turbine S is $W_1$=17,000 kW. The heat crossing quantity $Q_3$ in the heat exchanger 7 is $Q_3$=47,000 kW. The power $L_2$ consumed by the pump $P_1$ is 45 kW, and the power $W_2$ generated by the reaction water turbine K is 45 kW. The power of 45 kW is small relative to the input of 10,000 kW and therefore omissible without a problem.

FIG. 7 is an arrangement plan of a heat cycle system according to a third embodiment of the present invention. The heat cycle system shown in FIG. 7 is similar in arrangement to the heat cycle system according to the first embodiment (FIG. 3) of the present invention except that the heat cycle system according to the third embodiment has a structure in which the heat absorbing side of the heat exchanger (condenser) 7 is an external thermal output (external cooling source) $Z_1$, and there is no heat crossing between the exhaust of the turbine S and the intake of the compressor C. The heat cycle system of FIG. 7 has a turbine S installed at the upstream side of the condenser 7 of the refrigerator to obtain an output (power or work) $W_1$. In the heat cycle system of FIG. 7, the thermal efficiency $\eta_s$ of the turbine S on the Carnot cycle is:

$$\eta_s = (110-38)/273.15+110 \approx 0.18 \quad \text{(Eq. 40)}$$

The refrigerator performance coefficient $\epsilon$ on the reversible Carnot cycle is:

$$\epsilon = [273.15+(-10)]/[38-(-10)] \approx 5.4 \quad \text{(Eq. 41)}$$

The output (power or work) $W_1$ of the turbine S is:

$$W_1 = (\epsilon+1) \times \eta_s \approx 1.1 \quad \text{(Eq. 42)}$$

Assuming that the ratio of the pumping power $L_2$ of the pump P to the power $L_1$ of the compressor is 0.4%, the pumping power $L_2$ of the pump P is:

$$L_2 = 0.004 \quad \text{(Eq. 43)}$$

The work $W_1$ obtained from the turbine S is:

$$W_1 \approx 1.1 \quad \text{(Eq. 44)}$$

Because the work $W_1$ obtained from the turbine S is much larger than the pumping power $L_2$ of the pump P, the advantage of extracting power from the turbine S is great in comparison to the system configuration in which heat is merely dissipated from the heat exchanger 7.

FIG. 8 is an arrangement plan of a heat cycle system according to a fourth embodiment of the present invention. The heat cycle system shown in FIG. 8 has a heat engine A including a boiler B, a turbine $S_2$, and a condenser $Y_1$. In the condenser $Y_1$, waste heat is transferred to feedwater at the boiler inlet. That is, heat crossing is effected in the heat cycle system. The heat cycle system of FIG. 8 further has an arrangement for supplying a thermal output U from the condenser $Y_1$ to the outside.

FIG. 9 is an arrangement plan of a heat cycle system according to a fifth embodiment of the present invention. The heat cycle system shown in FIG. 9 has a heat pump (refrigerator J) combined with the heat engine A to effect increased heat crossing in the heat engine A. In the heat cycle system of FIG. 9, steam Eg generated in the boiler B drives the turbine $S_2$. Thereafter, the steam Eg is cooled in the condenser $Y_1$ and raised in pressure by a pump $P_2$ to form condensate Ee. The condensate Ee is heated to a temperature, for example, of 80° C. in the heat exchanger 7 (at the heat receiving side thereof) of the refrigerator J before being recirculated to the boiler B. Refrigerant vapor Fg compressed in the compressor C is cooled and liquefied in the heat exchanger 7 (at the heat dissipating side thereof) to form refrigerant liquid Fe. At the same time, the refrigerant generates a thermal output (hot water supply) $U_2$ at 80° C., for example, and heats the condensate Ee in the heat engine A to 80° C. The refrigerant liquid Fe is expanded through an expansion valve V to form refrigerant vapor Fg at 4° C., for example, which is then introduced into the heat exchanger $Y_1$ to cool the steam Eg. Accordingly, increased heat crossing is effected between the exhaust steam Eg and the condensate Ee in the heat engine.

In the heat cycle system of FIG. 9, one example of an operation of the heat engine carried out in a state where the heat pump J is at rest (i.e. heat exchange is effected directly between the exhaust steam Eg and the condensate Ee in the heat engine) is as follows. The steam temperature (turbine inlet) is 400° C., and the condensate temperature (turbine outlet) is 60° C. The thermal efficiency $\eta$ on the Carnot cycle is:

$$\eta = (400-60)/(400+273.15) \approx 0.505 \quad \text{(Eq. 45)}$$

On the other hand, when the heat pump J is operated as shown in FIG. 9 with the steam temperature set at 400° C., the condensate temperature (turbine outlet) is 10° C. The thermal efficiency $\eta$ on the Carnot cycle is:

$$\eta \approx 0.579 \quad \text{(Eq. 46)}$$

This shows that operating the heat pump in the heat cycle system of FIG. 9 causes the temperature difference to increase from 340° C. to 390° C. and allows the thermal efficiency of the turbine main unit to increase by:

$$0.579-0.505=0.074 \quad \text{(Eq. 47)}$$

Next, let us discuss the heat crossing in the heat cycle system of FIG. 9. When the heat pump J is at rest and no heat crossing is available, the condensate temperature (turbine outlet) and the feedwater temperature (boiler inlet) are both 10° C. In order to transform the condensate and the feedwater into steam at 400° C., 90 units of quantity of heat are required to heat the feedwater from 10° C. to 100° C., and 539 units of quantity of heat is required to transform the condensate at 100° C. into steam at 100° C. Further, 150 units of quantity of heat is required to heat the steam from 100° C. to 400° C. on the assumption that the specific heat of steam is 0.5. Accordingly, a total of 779 units of quantity of heat is required.

In a case where the heat pump is operated to effect heat crossing, the condensate temperature (turbine outlet) is 10° C., and the feedwater temperature at the boiler inlet is 70° C. Therefore, as compared to the boiler inlet feedwater temperature when no heat crossing is effected, i.e. 10° C., it is possible to save a quantity of heat which would otherwise be required to raise the feedwater temperature by 60° C., i.e. 60 units of quantity of heat. This is expressed as follows:

$$60/779=0.077 \quad \text{(Eq. 48)}$$

Therefore, the reduction in the input heat quantity by heat crossing improves the thermal efficiency of the heat cycle system as follows.

From the above Eq. 32, $$\eta = \eta_s/(1-Q_3/Q_1) \quad \text{(Eq. 32), i.e.}$$

$$\eta/\eta_s = 1/(1-Q_3/Q_1) \quad \text{(Eq. 49)}$$

the thermal efficiency of the heat cycle system shown in FIG. 9 is:

$$1 \div (1-0.077)=1.08 \quad \text{(Eq. 50)}$$

Thus, the thermal efficiency improves by approximately 8%.

Next, let us discuss the increase of heat drop due to heat crossing in the heat cycle system of FIG. 9. The thermal efficiency $\eta_s$ of the turbine when the heat pump is at rest and no heat crossing is available is:

$$\eta_s = (400-10)/(400+273.15)=0.579 \quad \text{(Eq. 51)}$$

Multiplying the thermal efficiency $\eta_s$, i.e. 0.579, by the above-described increase rate of the thermal efficiency finds that the thermal efficiency of the heat cycle system is 0.625.

In the basic cycle (FIG. 3) used in the present invention, the thermal efficiency can be improved by effecting heat crossing in the Rankine cycle even if the power consumed by the pump and the work generated from the reaction water turbine cancel each other or the power balance is somewhat positive. The improvement in the thermal efficiency can be attained without the need to increase the boiler capacity. For example, the steam temperature of 400° C., the condensate temperature (turbine outlet) of 60° C. and the boiler inlet feedwater temperature of 60° C. in the conventional system change to a steam temperature of 400° C., a condensate temperature (turbine outlet) of 10° C. and a boiler inlet feedwater temperature of 70° C., as stated above. Thus, the boiler inlet feedwater temperature only changes by 10° C. Accordingly, it is unnecessary to increase the boiler capacity.

FIG. 10 is an arrangement plan of a heat cycle system according to a sixth embodiment of the present invention. The heat cycle system shown in FIG. 10 comprises a combination of a heat engine A that per se performs heat crossing, and a heat pump (refrigerator J) including a turbine, wherein the turbine exhaust in the heat engine A is cooled by the refrigeration output of the refrigerator J. In the heat engine A of the heat cycle system shown in FIG. 10, steam Eg generated from a boiler B drives a turbine $S_2$. Thereafter, the steam Eg is cooled in a condenser $Y_1$ and raised in pressure by a pump $P_2$ to form condensate Ee. The condensate Ee is heated by the turbine exhaust steam in the condenser $Y_1$ before being recirculated to the boiler B. In the refrigerator J of the heat cycle system shown in FIG. 10, refrigerant gas Fg raised in pressure by a compressor C drives a turbine S. Thereafter, the refrigerant gas Fg is cooled in a heat exchanger 7 (at the heat dissipating side thereof) and compressed and thus raised in pressure by a pump $P_1$ to form refrigerant liquid Fe.

The high-pressure refrigerant liquid Fe discharged from the pump $P_1$ drives a reaction water turbine K to deliver work $W_2$. At the same time, the refrigerant liquid Fe is expanded and evaporated through a nozzle of the reaction water turbine K, which operates as an expansion valve, to form refrigerant gas Fg. The refrigerant gas Fg is heated in the heat exchanger 7 (at the heat absorbing side thereof) and further heated in the condenser $Y_1$ before being introduced into the compressor C.

Figure 11:
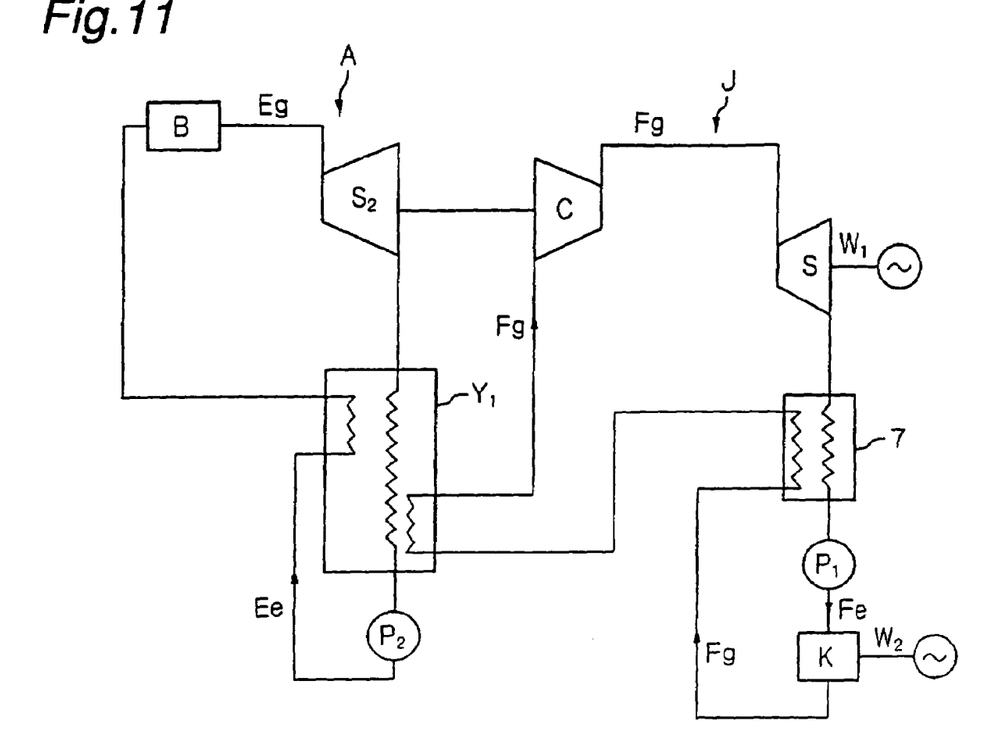
FIG. 11 is an arrangement plan of a heat cycle system according to a modification of the sixth embodiment of the present invention.

FIG. 11 is an arrangement plan of a heat cycle system according to a modification of the sixth embodiment of the present invention. In the heat cycle system shown in FIG. 11, the turbine $S_2$ is mechanically connected to the compressor C so as to drive it, thereby eliminating the need of a motor for driving the compressor C. The rest of the arrangement of the heat cycle system is the same as that of the heat cycle system shown in FIG. 10. Therefore, a repeated description thereof is omitted.

FIG. 12 is an arrangement plan of a heat cycle system according to a seventh embodiment of the present invention. The heat cycle system shown in FIG. 12 comprises a combination of a heat engine D using an Otto cycle, a Diesel cycle, a Sabathe cycle, or a Stirling cycle, and a refrigerator (heat pump) including a turbine. In the heat cycle system of FIG. 12, an electric generator $G_1$ connected to the turbine, a compressor motor M, and an electric generator $G_3$ driven by the heat engine are electrically connected to each other. In the heat cycle system of FIG. 12, refrigerant gas raised in pressured by a compressor C drives a turbine S. Thereafter, the refrigerant gas is cooled in a heat exchanger 7 (at the heat dissipating side thereof) and compressed and thus raised in pressure by a pump $P_1$ to form refrigerant liquid Fe.

The high-pressure refrigerant liquid Fe discharged from the pump P drives a reaction water turbine K to deliver work $W_2$. At the same time, the refrigerant liquid Fe is expanded and evaporated through a nozzle of the reaction water turbine K, which operates as an expansion valve, to form refrigerant gas Fg. The refrigerant gas is heated in the heat exchanger 7 (at the heat absorbing side thereof) and further heated in a heat exchanger 8 by waste heat (cooling heat and exhaust gas heat) from the heat engine before being sucked into the compressor C. The waste heat from the heat engine is transferred to the refrigerant gas Fg in the heat exchanger 8. The reaction water turbine K may be simply an expansion valve.

FIG. 13 is an arrangement plan of a heat cycle system according to an eighth embodiment of the present invention. The heat cycle system shown in FIG. 13 comprises a combination of a heat engine D using an Otto cycle, a Diesel cycle, a Sabathe cycle, or a Stirling cycle, and a refrigerator (heat pump) including a turbine, as in the case of the heat cycle system of FIG. 12. In the heat cycle system of FIG. 13, the compressor C is driven by the output of the heat engine. The arrangement of the rest of the heat cycle system is the same as that of the heat cycle system shown in FIG. 12. In FIGS. 12 and 13, the heat engine D uses any of an Otto cycle, a Diesel cycle, a Sabathe cycle, and a Stirling cycle.

FIG. 14 is an arrangement plan of a heat cycle system according to a ninth embodiment of the present invention. The heat cycle system shown in FIG. 14 comprises a combination of a fuel cell N and a refrigerator (heat pump) including a turbine. In the heat cycle system of FIG. 14, refrigerant gas Fg raised in pressure by a compressor C drives a turbine S. Thereafter, the refrigerant gas Fg is cooled in a heat exchanger 7 (at the heat dissipating side thereof) and compressed and thus raised in pressure by a pump P to form refrigerant liquid Fe. The high-pressure refrigerant liquid Fe discharged from the pump P is expanded and evaporated through an expansion valve V to form refrigerant gas Fg. The refrigerant gas is heated in the heat exchanger 7 (at the heat absorbing side thereof) and further heated in a heat exchanger 8 by waste heat from the fuel cell N before being sucked into the compressor C. The waste heat from the fuel cell is transferred to the refrigerant gas Fg in the heat exchanger 8. In the heat cycle system of FIG. 14, an electric generator G connected to the turbine S, a compressor motor M, and the output of the fuel cell are electrically connected to each other.

I claim:

1. A heat cycle system comprising:
a compressor configured to compress a working gas;
a turbine configured to be driven by the working gas compressed in the compressor;
a first heat exchanger having a heat dissipating side;
a second heat exchanger;
a pump configured to be able to raise the pressure of the working gas; and
a reaction water turbine,
wherein the working gas is cooled by passing through the heat dissipating side of the first heat exchanger and then raised in pressure by the pump to form high-pressure working liquid after being compressed by the compressor and driving the turbine to deliver work, said high-pressure working liquid driving the reaction water turbine to deliver additional work while being expanded and evaporated to form the working gas, said working gas being heated through the first heat exchanger and through the second heat exchanger before being introduced into the compressor, the additional work being delivered from the reaction water turbine and power consumed by the pump approximately canceling each other.

2. A heat cycle system according to claim 1, further comprising a compressor driving motor, a turbogenerator, a pump driving motor and a water turbine-driven generator being electrically connected to each other.

3. A heat cycle system comprising:
a compressor configured to compress a working gas;
a turbine configured to be driven by the working gas compressed in the compressor;
first and second heat exchangers, the first heat exchanger having a heat dissipating side;
a pump configured to be able to raise the pressure of the working gas; and
an expansion valve, wherein the working gas is cooled by passing through a heat dissipating side of the first heat exchanger and then raised in pressure by the pump to form high-pressure working liquid after being compressed by the compressor and driving the turbine to deliver work, said high-pressure working liquid being expanded and evaporated through the expansion valve to form the working gas, said working gas being heated through the first heat exchanger to a temperature of about −10° C. and further being heated through the second heat exchanger before being introduced into the compressor.

4. A heat cycle system according to claim 3, wherein said second heat exchanger transfers either waste heat of turbine exhaust steam in a Rankine cycle or waste heat from a fuel cell to said working gas.

5. A heat cycle system according to claim 3, wherein a thermal efficiency η of the heat cycle system is:

$$\eta = (Q_1 - Q_2)/(Q_1 - Q_3) = \eta_s/(1 - Q_3/Q_1)$$

$$Q_3 = (1 \text{ to } 0.1)Q_2$$

where:
$\eta_s$ is a thermal efficiency of the turbine;
$Q_1$ is a quantity of heat retained by the working fluid at the turbine inlet side;
$Q_2$ is a quantity of heat output from the working fluid at the turbine outlet side; and
$Q_3$ is a quantity of heat transferred from the working fluid at the turbine outlet side to the working fluid at the turbine inlet side.

6. A heat cycle system comprising:
a heat engine including a boiler configured to generate steam, a first turbine configured to be driven by the steam, a condenser configured to cool the steam, and a first pump configured to raise the pressure of the cooled steam, and
a refrigerator including a compressor configured to compress refrigerant gas, a second turbine configured to be driven by the refrigerant gas compressed by the compressor, a second pump configured to raise the temperature of the refrigerant gas, a reaction water turbine, and a heat exchanger including a heat dissipating side and a heat absorbing side,
wherein steam generated in the boiler drives the first turbine and is thereafter cooled in the condenser and raised in pressure by the first pump to form high-pressure condensate, the high pressure condensate then being recirculated to the boiler, and
wherein the refrigerant gas compressed in the compressor drives the second turbine to deliver work and is thereafter cooled by passing through the heat dissipating side of the heat exchanger and then raised in pressured by the second pump to form high-pressure refrigerant liquid, said high-pressure refrigerant liquid driving the reaction water turbine to deliver additional work while being expanded and evaporated to form the refrigerant gas, said refrigerant gas being heated by passing through the heat absorbing side of the heat exchanger and through the condenser before being introduced into the compressor.

7. A heat cycle system according to claim 6, wherein said high-pressure condensate is heated in the condenser before being recirculated to the boiler.

8. A heat cycle system according to claim 6, wherein said compressor is driven by the output of said first turbine of said heat engine.

9. A heat cycle system comprising:
a heat engine, and
a refrigerator including a compressor configured to compress a refrigerant gas, a turbine configured to be driven by the refrigerant gas compressed by the compressor, a first heat exchanger including a heat dissipating side and a heat absorbing side, a pump configured to raise the pressure of the refrigerant gas, and an expansion valve,
wherein the refrigerant gas compressed in the compressor drives the turbine to deliver work and is thereafter cooled at the heat dissipating side of the first heat exchanger and then raised in pressure by the pump to form high-pressure refrigerant liquid, said high-pressure refrigerant liquid being expanded and evaporated to form refrigerant gas, said refrigerant gas being heated by passing through the heat absorbing side of the first heat exchanger and by waste heat from the heat engine in a second heat exchanger before being returned to the compressor.

10. A heat cycle system according to claim 9, wherein said compressor is driven by an output of said heat engine.

11. A heat cycle system comprising:
a fuel cell and
a refrigerator including a compressor configured to compress a refrigerant gas, a turbine configured to be driven by the refrigerant gas compressed by the compressor, a first heat exchanger including a heat dissipating side and a heat absorbing side, a pump configured to raise the pressure of the refrigerant gas, and an expansion valve,
wherein the refrigerant gas compressed in the compressor drives the turbine to deliver work and is thereafter cooled at the heat dissipating side of the first heat exchanger and then raised in pressure by the pump to form high-pressure refrigerant liquid, said high-pressure refrigerant liquid being expanded and evaporated to form the refrigerant gas, said refrigerant gas being heated by passing through the heat absorbing side of the first heat exchanger and by waste heat from the fuel cell in a second heat exchanger before being returned to the compressor.

* * * * *